UNITED STATES PATENT OFFICE.

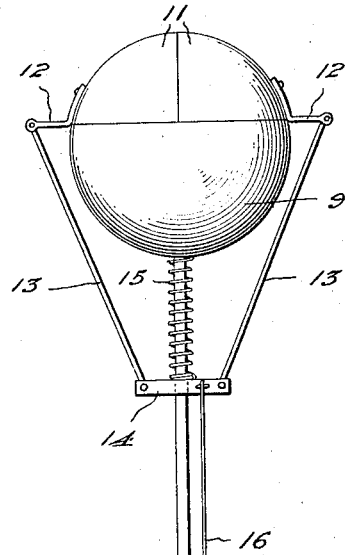
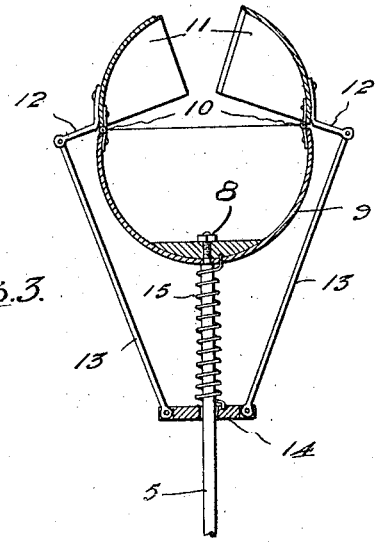
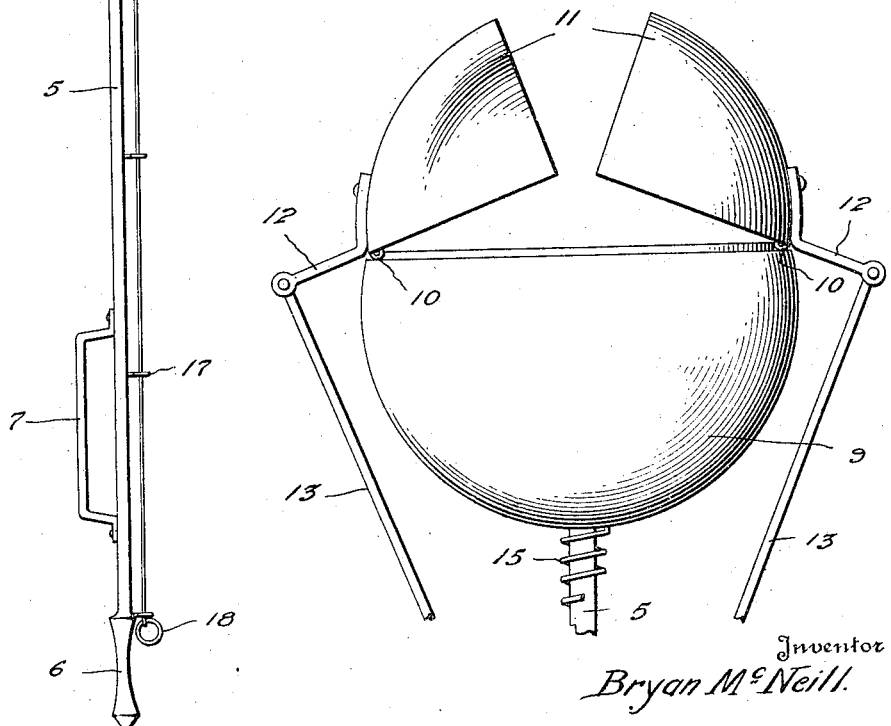

BRYAN McNEILL, OF WATTENSAW, ARKANSAS.

FRUIT-PICKER.

1,241,411. Specification of Letters Patent. Patented Sept. 25, 1917.

Application filed March 11, 1916, Serial No. 83,543. Renewed July 30, 1917. Serial No. 183,647.

*To all whom it may concern:*

Be it known that I, BRYAN McNEILL, a citizen of the United States, residing at Wattensaw, in the county of Lonoke and State of Arkansas, have invented certain new and useful Improvements in Fruit-Pickers, of which the following is a specification.

This invention relates to improvements in fruit pickers, one object of the invention being the provision of a handle carried picker that is provided with spring closed manually opened jaws in conjunction with a receptacle mounted at the same end of the handle for receiving a certain quantity of the fruit before the same is ready to be emptied.

A further object of the invention is the provision of an open-ended receptacle mounted fixedly at one end of a handle or staff, and having hingedly connected thereto two covering jaws, that coöperate to form with the receptacle a closed hopper for the fruit, a spring being provided to hold the jaws closed, while manually operated means is provided to open the jaws.

A still further object of this invention is the provision of a fruit picker, which is simple, durable and inexpensive in construction, and which is thorougly efficient and practical in use.

In the accompanying drawings:—

Figure 1 is a plan view of the complete fruit picker, the jaws being closed.

Fig. 2 is an enlarged view of the picking end of the mechanism, the jaws being open.

Fig. 3 is a section through the receptacle and jaws, showing the detail construction of the parts.

Referring to the drawings, the numeral 5 designates the staff, which is provided at one end with the hand grip 6, while attached thereto a short distance from the hand grip is a detachable hand grip 7, thus providing means to support the staff, as for instance with the left hand while the picking mechanism is operated.

Fixed at the opposite end of the staff by means of the fastening device 8, is a semi-spherical or semi-globular fruit receptacle 9, the same being preferably made of sheet metal, while connected at substantially diametrical points to the upper edge thereof by means of the hinges 10, are the combined jaws and covers 11, there being two of these. Each jaw is therefore substantially a quarter sphere or globe.

Connected to each jaw adjacent the hinge point, is the L-shaped lever 12, whose free end is pivoted to the rod 13, whose other end is pivoted to one terminal of the double arm 14, which surrounds the staff 5, and is adapted to slide longitudinally thereof. Thus any movement imparted to the double arm or cross arm 14 will impart through the rods 13 and levers 12, movement to the jaws, a spring 15 being mounted upon the staff and exerting a pull between the receptacle 9 and the cross arm 14 to hold the jaws closed. The ends of the springs are connected respectively to the receptacle 9 and the cross arm 14.

In order to actuate the cross arm in opposition to the spring 15 and thus open the jaws, the wire or other connection 16, being connected to the cross arm, and guided through the guide eyes 17 carried by the staff, a ring 18 being carried by the other end adjacent to the hand grip.

What I claim, as new, is:—

In a fruit picker, the combination of a hollow body open at its upper end, a staff secured to the lower end of said body for supporting it, a pair of cover sections hinged at diametrically opposite points to the upper edge of said body, an arm projecting outwardly from each cover section at the hinged end thereof, a cross arm slidable on said staff beneath the body, a spring connecting the cross arm to the body to urge the cross arm upwardly toward the body, two links, each pivotally connected at its opposite ends to one end of said cross arm and one of said outwardly extending arms to swing the sections into open and closed position upon sliding movement of the cross arm upon the staff, and a pull wire rigidly connected at one end of the cross arm and slidably mounted on the staff for facilitating the operation of the cross arm.

In testimony whereof I affix my signature.

BRYAN McNEILL.

Copies of this patent may be obtained for five cents each, by addressing the "Commissioner of Patents, Washington, D. C."